United States Patent

[11] 3,572,652

| [72] | Inventor | Loren Hale |
| | | 3703 E. 36th St. N., Tulsa, Okla. 74135 |
| [21] | Appl. No. | 800,309 |
| [22] | Filed | Dec. 23, 1968 |
| [45] | Patented | Mar. 30, 1971 |
| | | Continuation of application Ser. No. 651,345, June 19, 1967, now abandoned. |

[54] APPARATUS FOR MIXING, DISPENSING AND DISPERSING WET OR DRY PLASTIC MATERIALS UNDER PRESSURE OR NON PRESSURE
8 Claims, 8 Drawing Figs.

[52] U.S. Cl. .................................................. 259/151, 259/169, 259/178
[51] Int. Cl. .................................................. B28c 5/00
[50] Field of Search ........................................ 259/145–149, 151–154, 161, 169, 162, 170, 178, 9, 10, 45, 46, 134–137; 239/416.5

[56] References Cited
UNITED STATES PATENTS

| 1,423,853 | 7/1922 | Hodgson | 259/151 |
| 2,649,289 | 8/1953 | Giberson | 259/151 |
| 2,743,912 | 5/1956 | True | 259/169 |
| 2,858,116 | 10/1958 | Hale | 259/9 |
| 3,006,615 | 10/1961 | Mason | 259/151X |

*Primary Examiner*—Robert W. Jenkins
*Attorney*—Head & Johnson

ABSTRACT: A gun for cement and similar plastic materials which are mixed and dispensed under option wet or dry mix or pressure or nonpressure conditions and discharged from a mixing vat by a reversible rotor-stator pump to a nozzle.

Patented March 30, 1971

INVENTOR.
LOREN HALE

BY Head & Johnson

ATTORNEYS

INVENTOR.
LOREN HALE
BY
Head & Johnson
ATTORNEYS

Patented March 30, 1971

INVENTOR.
LOREN HALE

BY Heud & Johnson

ATTORNEYS

Patented March 30, 1971

INVENTOR.
LOREN HALE

BY Head & Johnson

ATTORNEYS

APPARATUS FOR MIXING, DISPENSING AND DISPERSING WET OR DRY PLASTIC MATERIALS UNDER PRESSURE OR NON PRESSURE

CROSS-REFERENCE TO RELATED APPLICATION

This invention is a continuation of application Ser. No. 651,345, filed Jun. 19, 1967, and now abandoned.

BACKGROUND OF THE INVENTION

This invention is related to the agitating, mixing, dispensing and dispersing of plastic material as for example, cement-sand or the like mixtures. Typical of such devices is shown in prior Pat. Nos. 2,858,116 and 2,965,312 of which this invention is an improvement thereof. Prior art Pat. Nos. such as 2,743,912; 2,788,197 and 3,026,094 have taught various types of mixing and dispensing apparatus for wet mixtures of plasticized materials such as cement-sand, and water. However, these devices have not been convertible to operation for either a wet mix or a dry mix or pressure or nonpressure operation as desired by the operator thereof.

SUMMARY

Accordingly this invention provides a readily convertible single or double agitation, mixing, dispensing, and dispersing vat system for plastic materials which may be converted either into a pressure or nonpressurized system to handle wet mix materials or dry mix materials as desired or needed by the operator. In addition the system provides for a spray nozzle attachable to the discharge of the mixing and dispensing vat which is further convertible into handling wet mix or dry mix materials.

Accordingly it is an object of this invention to provide an apparatus for dispensing wet or dry mix plastic materials such as cement-sand and aggregate materials which overcomes the objections to the prior art devices and which further provides ease of convertibility to a pressurized or nonpressurized discharge system for the materials.

It is a further object of this invention to provide an outlet means at the bottom of the mixing and dispensing vat which is adapted to further assist in dispensing the premixed material into the discharge opening. In conjunction with this object it is further provided with a rotary type pump including fluid operated booster therewith to assist in dispensing the premixed materials.

A still further object of this invention is to provide an agitation-wiper blade for use in the mixing vat which is readily adjustable to the various types of wet or dry mix material and aggregate.

Further objects of the invention will become apparent upon further reading of the specification and claims herewith when taken in conjunction with drawings.

DESCRIPTION OF THE PREFERRED EMBODIMENTS

Figure 1:
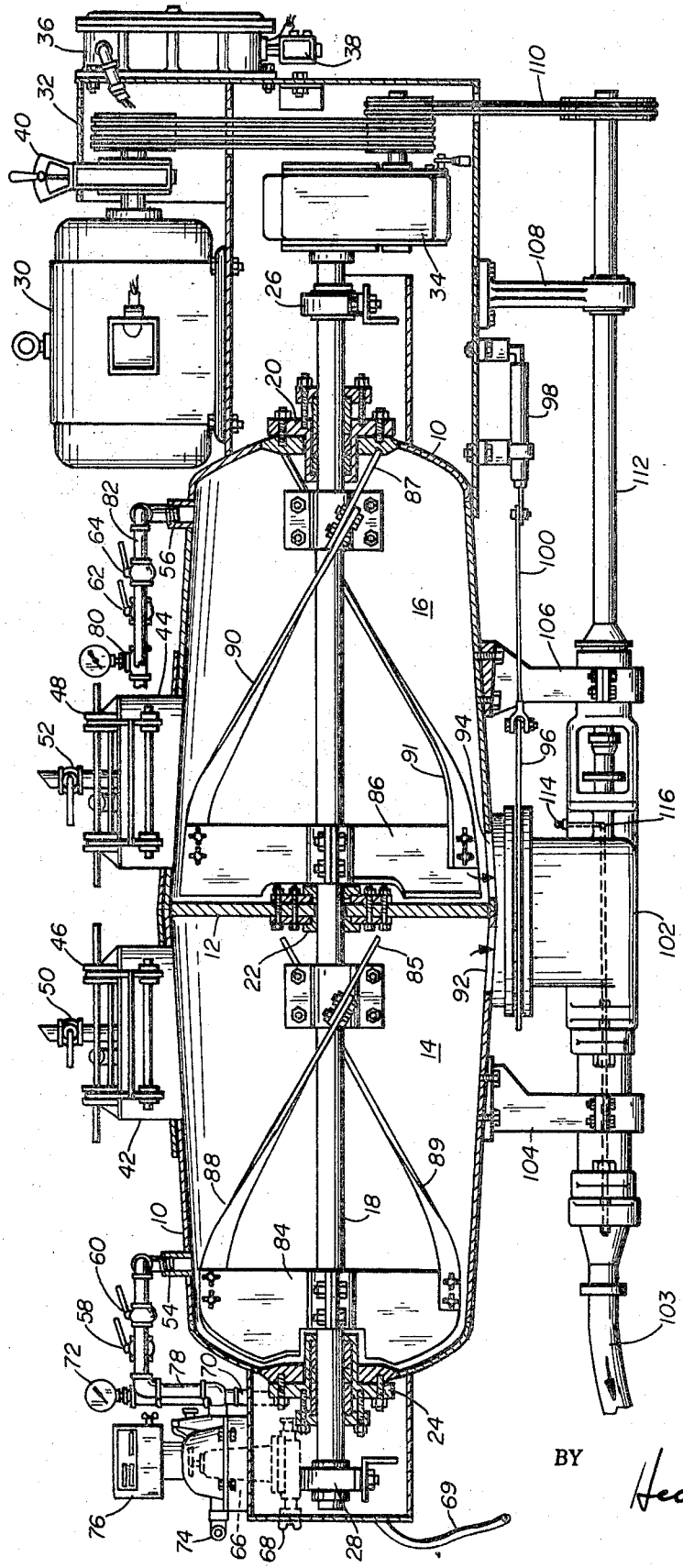
FIG. 1 is a side elevational view, partly in cross section, depicting a double pressurized mixing vat and apparatus of this invention.

Referring now to FIG. 1, a vat or tank double vat-pressure system includes a partition 12 forming compartments 14 and 16. A rotatable agitator shaft 18 extends axially across the full length of the vat 10, being rotatably supported and sealed by packing glands 20, 22 and 24 and pillow block bearings 26 and 28. The shaft is rotated by a suitable prime mover, either an internal combustion engine or an electric motor 30 as shown. Suitable belt drive 32 from the output of the prime mover is adapted to rotate shaft 18 via a gear reduction means, if necessary, 34. An electric starter box 36 and starter control 38 are used in conjunction with motor 30. A forward and reverse transmission mechanism and control 40 couples the output of prime mover 30 to the drive belt system 32. Each compartment 14 and 16 includes a respective material inlet openings 42 and 44 which are closable by pressure sealable and quick opening lids 46 and 48 respectively. A pressure bleed valves 50 and 52 are respectively incorporated, as shown herein, with the lids 46 and 48. Likewise respective fluid openings 54 and 56 communicate into respective compartments 14 and 16. These inlets are properly controllable with valves 58 for one line, and valve 60, in one instance similarly with valves 62 and 64 for the other respective compartments 16. An air pressure regulator 66, shown dotted, joins fluid inlet 68 to the line 70 which is controlled by valve 58. Air and/or water inlet hose 69 is available for use. A fluid pressure gauge 72 is utilized in conjunction therewith. Additional fluid inlet 74, usually for liquids, enters flow meter 76 with the outlet to conduit 78 which is controlled by valve 60. Similarly relative to fluid inlet 56 for compartment 16 appropriate connection is made through a respective air regulator to line 80 which is controlled by valve 62 and liquid conduit 82 controlled by valve 64. Within each compartment and attached to shaft 18 are agitator blades 84 and 85 in compartment 14 while agitator blades 86 and 87 are within compartment 16. Spiral rake blades 88 and 89 extend between blades 84 and 85 in compartment 14. Similarly with spiral rake blades 90 and 91 in 16. A unique feature of this invention is the adjustability of the blades by providing intersecting slots as more aptly shown in FIG. 8.

Within the lowermost portion of compartments 14 and 16 are respective outlets 92 and 94. As shown in the embodiment of FIG. 1, the compartments are controlled by a slide or plug valve 96 which is actuated by a hand or fluid pressure operated mechanism 98 through linkage 100. The valve being so as to provide situations for having either both openings 92 and 94 open partially or fully, simultaneously into a discharge pump 102, or optionally providing one or the other partial or full opening into the pump. The pump is supported to the vat by extensions or legs 104, 106, and 108 or similar mechanisms and is given by a power takeoff 110 rotating shaft 112. Although, the details of the pump are more aptly described in FIG. 6, that type preferably used and shown in this invention is of the type sold under the trademark MOYNO which typically includes a hardened steel rotor which operates similar to a screw conveyor within a resilient stator. The stator in this instance including as a part of the inventive concepts of this invention, a separate fluid supply connection extending through the interior of the rotor which is discharged at the end thereof in conjunction with the materials that are being pumped.

In the operation of the device of FIG. 1, all air and/or liquid supply conduits are first connected to the respective meters and regulator system for supply to compartments 14 and 16 through openings 54 and 56 as thereafter metered and controlled by the operator. Prior to charging of the compartments the prime mover 30, either an electrical motor or internal combustion engine is started. The transmission and clutch are engaged to begin the rotation of shaft 18 and the agitator blades along with driving shaft 112 of the rotor pump 102. The compartments are then charged with the plastic mix materials. This is accomplished as, for example, with a cement-water-aggregate mix by injecting metered amounts of water into each compartment. With the lids 46 and 48 respectively open the cement aggregate material is loaded into the compartments in the total amount determined by the desired material-water ratio. Slide valve 96 at this point is in a closed position while the materials are being agitated. The air supply is injected into each compartment after closing lids 46 and 48 and associated bleeder valves 50 and 52, thus placing the materials in each compartment under pressure. When it is desired to discharge materials from one or both compartments, pressure fluid actuates cylinder 98 and slide valve 96 is opened to discharge the contents within compartment 14 and/or compartment 16 into the rotor pump and booster system. In some instances the material passing through the discharge hose 103 is conducted to a nozzle such as that type shown in FIG. 7 herein, or in some instances is pumpable and dischargeable without a nozzle. With the nozzle trained on the desired target and with the nozzle air valve partially open, the material is injected through the nozzle. The amount of opening of the nozzle air valve is determined by the desired spray pattern, distance from the target, and density of the shot material, etc. For example, the air injected into the nozzle is increased as the target distance therefrom is increased. After one compartment has emptied its contents, the slide valve 96 is moved to a position to allow the other compartment to empty. Upon release of pressure through bleeder valve 50 and opening of lid 46, compartment 14 may be recharged while compartment 16 is being discharged, the process being repeated as needed. Cleaning of the discharge conduit is accomplished with this invention by temporarily blocking the discharge end of the nozzle, turning the nozzle air valve open, causing air to bypass through the nozzle building up pressure against the material within the nozzle and in the conduit 103. The rotor pump is reversed, the pressure within one or both compartments 14 released and valve 96 is opened, the material in the hose is blown back into the compartments. When the vat operator hears air escaping from the bleeder valves on the cover or lids, he known the material hose 103 is clean. Such a procedure is valuable in situations wherein it is necessary to depressurize the vat in the middle of a load, to add water, or where an obstruction in the nozzle and material hose exists, or material is too thin and must have more aggregate or cement added.

Figures 7, 8:
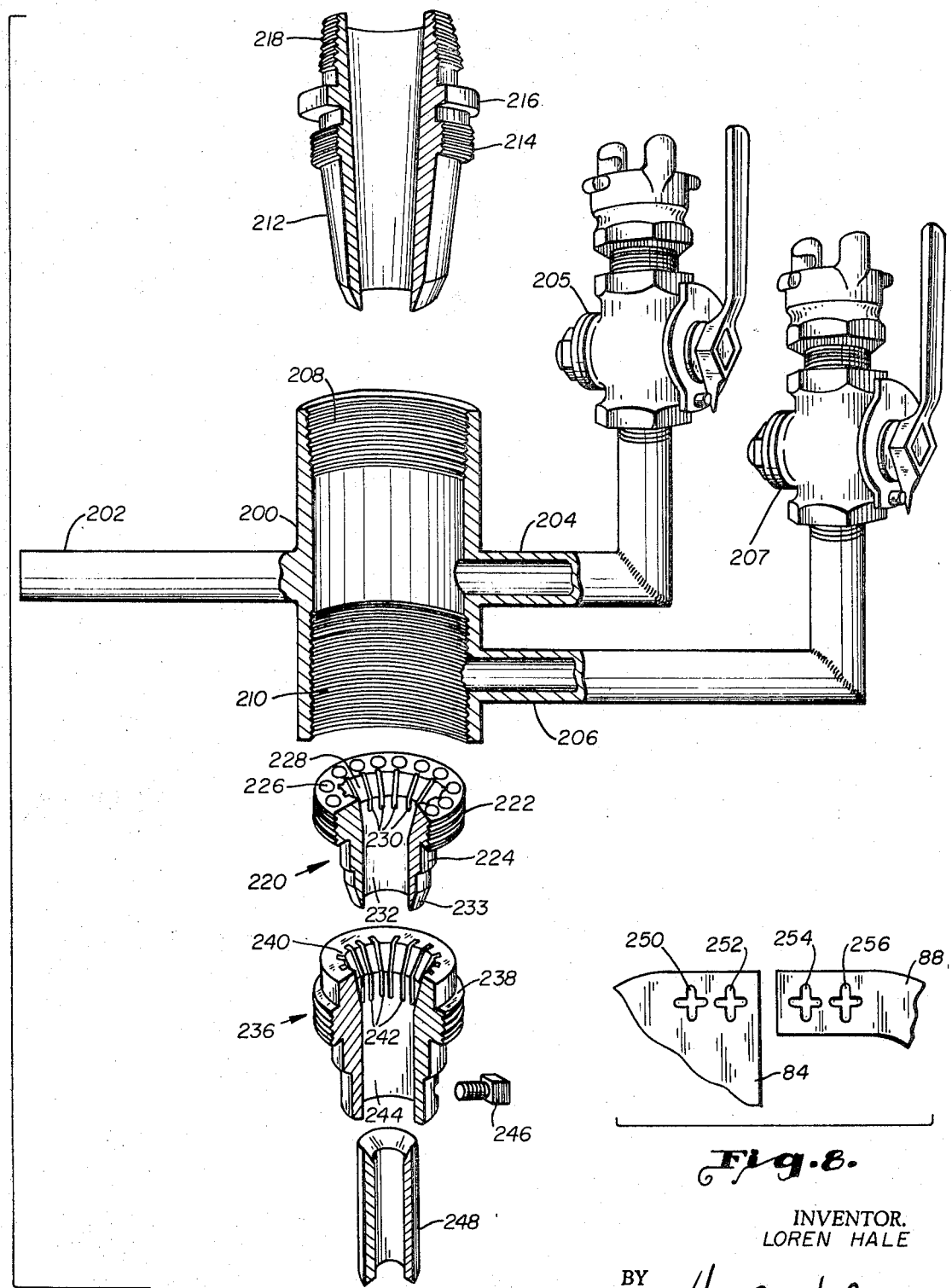
FIG. 7 is an exploded view of the dispersing nozzle utilized in conjunction with this invention.
FIG. 8 is a partial view depicting an adjustable paddle or wiper blade used in the mixing and agitation vat of this invention.

In the operation of a double vat of FIG. 1 utilizing a dry mix discharge system, the nozzle shown in FIG. 7, which includes more than one fluid inlet jet system ordinarily is used in conjunction therewith. The motor or internal combustion engine is started, the clutch is engaged and the agitation and rotor pump system are in operation, the unit is ready for charging and use. Chargeable material is inserted into the open hatch in the total amount determined by the operator. In some instances, two to three percent moisture is added to reduce dusting and rebound or waste. The gasket seal on the lid is cleaned and thereafter closed, locking the vat, closing the bleeder valve allowing the vat to be pressurized. The air pressure within the compartment is regulated to the desired amount for the material being sprayed. When the nozzle operator is ready to receive material, for example, via an intercom system, the slide valve 96 is opened as heretofore described. The relatively dry mix materials then flow into the rotor pump housing which feeds the material through the material hose 103 to the nozzle for shooting, spraying, sandblasting etc. With the nozzle trained on the target, the operator will open the air valve and/or the water valve. The opening of the water and the air valves is determined by the desired spray pattern, distance from the target, density of the shot material, and so on.

SINGLE VAT SYSTEM

Figure 2:
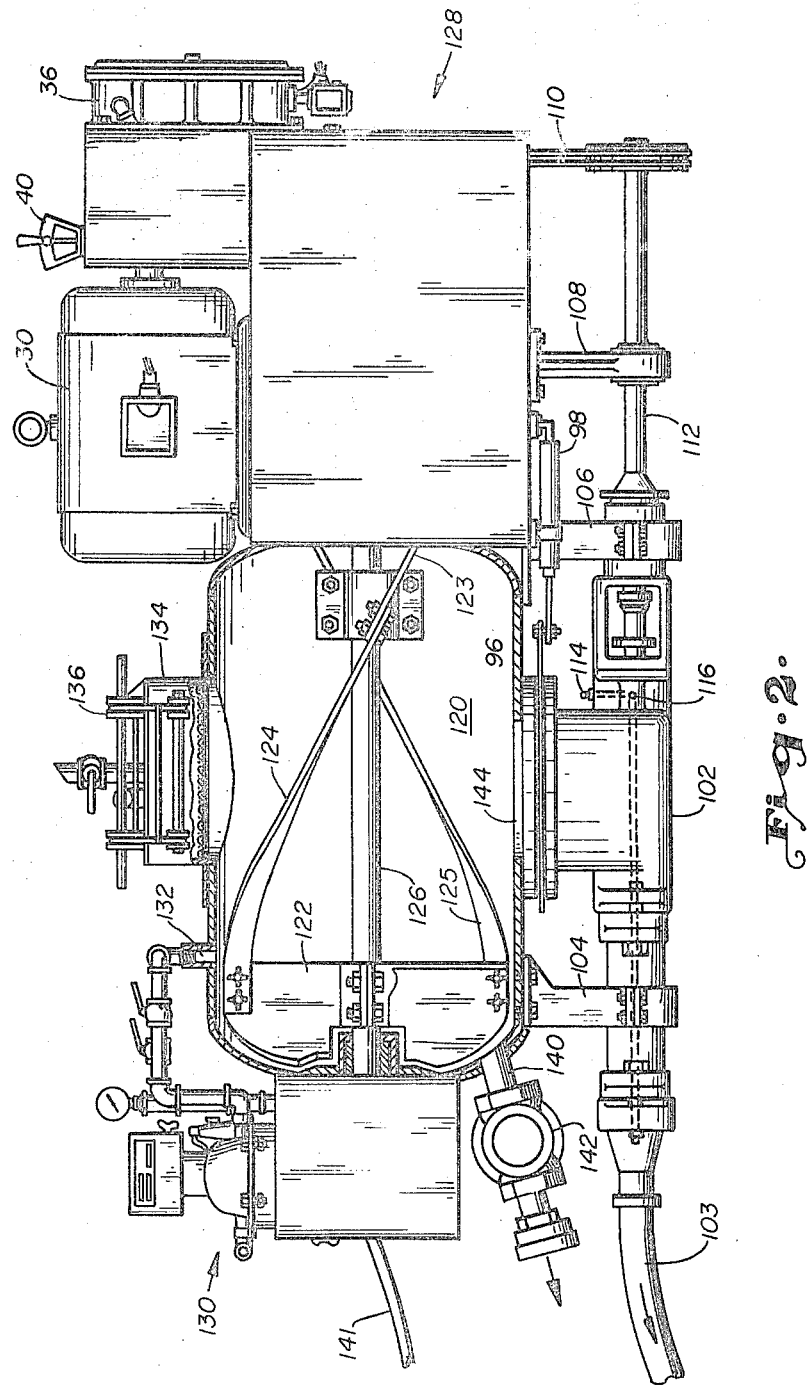
FIG. 2 is a side elevational view, partly in cross section, depicting a single mixing vat capable of operation either under or without pressure.

Referring now to FIG. 2, a single mixing vat 120 similarly includes agitator blades 122 and 123 between which spiral raked blades 124 and 125 are connected adjustably not only axially but outwardly relative to the sides of the bat 120. The agitation mechanism is attached to shaft 126 which is rotated through suitable drive and control mechanism generally indicated by the numeral 128 which is similar to that described in FIG. 1. Likewise, the fluid pressure inlet mechanism as for example, to supply fluids such as compressed air or liquids, including meters, regulators and indicators, is generally indicated by the numeral 130. These devices supplying such fluids under pressure to the inlet 132 as needed. An inlet opening 134 includes a quick opening or completely removable lid 136 similar to that described for each chamber in FIG. 1. A material outlet connection 140 from the vat or compartment 120 communicates with the compartment 120. This outlet is controlled by a valve 142. Similar to the alternate discharge system which is generally used under nonpressurized conditions, the pump system described in FIG. 1 is interconnected to the opening 144 in the lower portion of the tank or vat 120, into rotor type pump 102. The opening is controlled by slide valve 96 from a fluid pressure supply mechanism 98. An auxiliary fluid supply connection 114 interconnects to the interior of the pump rotor shaft 116 as shown in dotted line and hereafter more particularly described.

DOUBLE-VAT NONPRESSURE SYSTEM

Figure 3:
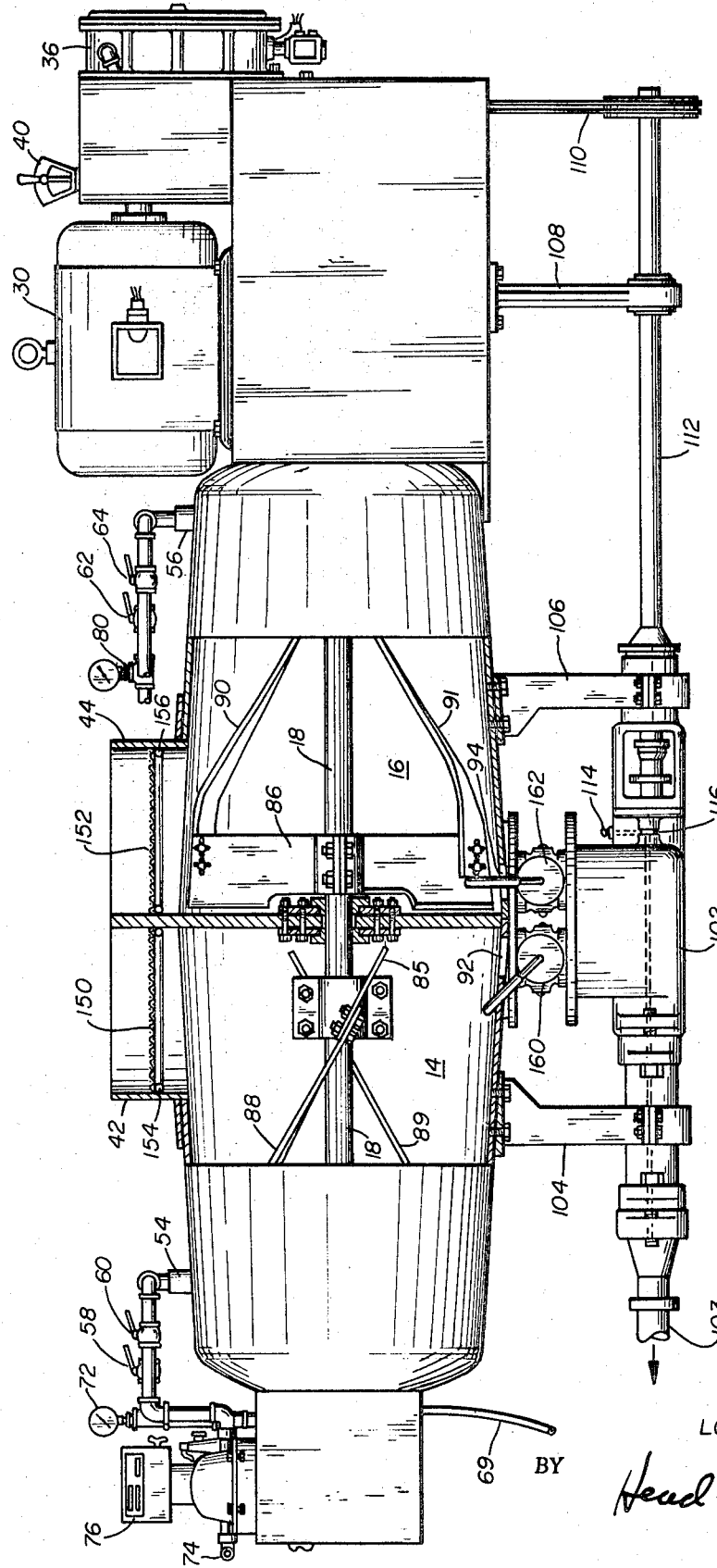
FIG. 3 is a side elevational view, partly in section, depicting a double chamber mixing and agitation vat for use in nonpressurized system.

Referring now to FIG. 3, the apparatus depicts and shows a vat similar to that shown in FIG. 1 and like numerals are used for like parts. The primary differences between the device of FIG. 1 and that shown in FIG. 3, is that in a nonpressure system there is no need for the high pressure covers or lids. Instead, respective openings 42 and 44 leading into compartments 14 and 16 are fully opened to receive the materials making up the resultant plastic mix. Typically, this is sand, cement and aggregate. In each opening a screen 150 and 152 are respectively seated upon a ridge 154 and 156 and are completely removable from the openings for cleaning or repair of the chamber internals. Relative to rotor type pump 102, the openings 92 and 94 thereto are controlled by rotary gate valves 160 and 162 for control of the output from respective compartments 14 and 16.

As shown in FIG. 3, the device mechanically is the same as that shown in FIG. 1, without the pressure lid system. The operation is identical for either a wet mix or a dry mix material, though of course with the exception that pressure fluid is not inserted into the compartment so as to assist in the agitation and discharge of the materials therein.

ROTOR PUMP

Figure 4:
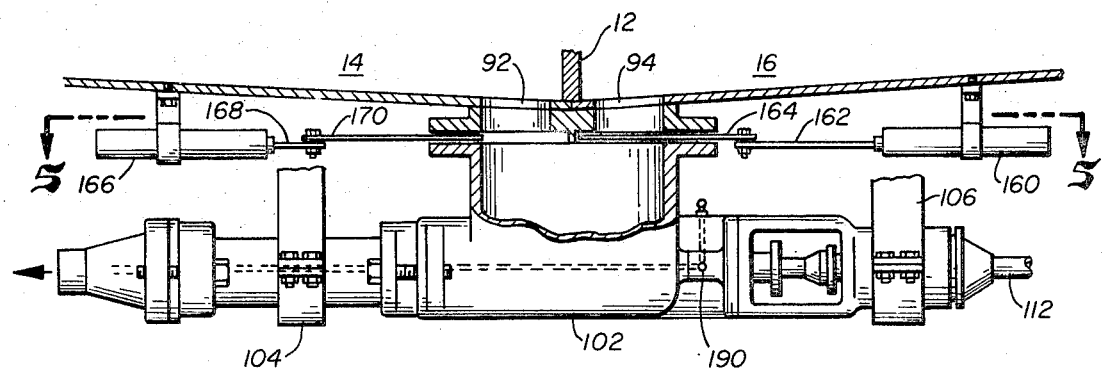
FIG. 4 is a partial view of the outlet dispensing means from a double vat device such as shown in FIGS. 1 and 3.
Figure 5:
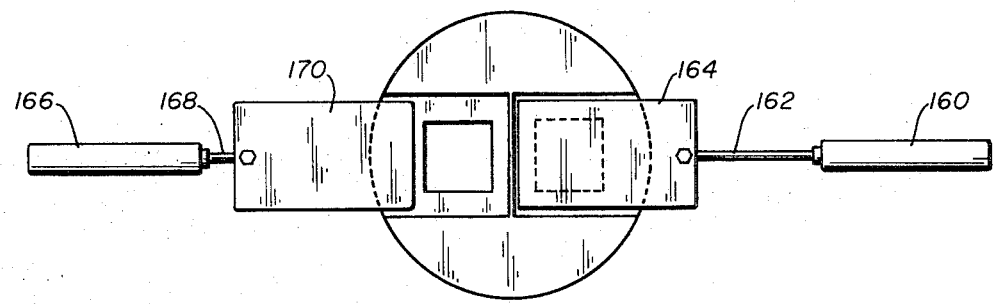
FIG. 5 is a view taken along the line 5-5 of FIG. 4.

The embodiment of FIGS. 4 and 5 describes but an alternate means for controlling the outflow from openings 92 and 94 of respective compartments 14 and 16 in the double vat system into the rotor pump 102. As such, a fluid pressure actuating mechanism such as a hydraulic piston and cylinder 160 through linkage 162 operates slide valve 164 to control the outflow of vat 16. Likewise fluid pressure cylinder 166 through linkage 168 controls slide valve 170.

Figure 6:
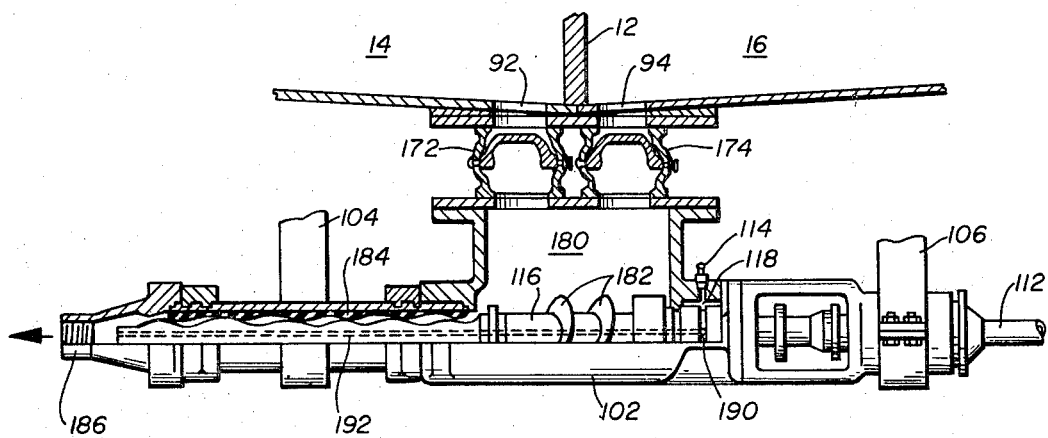
FIG. 6 is a further side elevational view of an additional embodiment, and further depicting, partly in section, the roller-type pump using the dispensing outlet of this invention.

Referring now to the embodiment of FIG. 6, the rotor pump 102 of this invention is more aptly described in combination with a quick acting valve control mechanism 172 and 174. Material flowing outwardly from compartments 14 and/or 16 enters into the inlet chamber 180 of the rotor pump 102. Rotor shaft 116 includes a preliminary auger portion 182 which moves the material into that space between the rotor 116 and the rubber stator portion 184 moving it thence forwardly. The rotor is rotated by power supply means 110 as shown in the other views by way of shaft 112 which is connected thereto. The pump thus carrying the plastic mix, whether it be in a dry or wet form, is discharged outwardly into outlet 186 as shown by the arrow. As an auxiliary to assist in the pumping operation, fluid pressure connection 114 is made to a suitable sealed manifold area 118 which, by way of one or more openings 190, interconnect with the axial opening 192 through the rotor and shown in dotted line. This provides a means for supplying pressure fluids to assist in the pumping operation of a wet or dry mix plastic materials such as sand, cement, aggregate and water mixes.

An auxiliary fluid injection system is provided in the rotor pump wherein additional air and/or liquids are injected through opening 114 which is caused to pass into the interior of rotor 116 and thence outwardly to give an additional boost to the materials discharging from the rotor pump.

MANIFOLD NOZZLE

Referring now to FIG. 7, a nozzle utilized in this invention is described. A nozzle body or jacket 200 includes a hand grip portion 202 and fluid connection conduits 204 and 206. The interior of the body or jacket includes threads 208 at one end and threads 210 at the other.

A material inlet nozzle 212 is adapted to threadably interconnect by way of threads 214 with the rear threads 208. Sleeve 216 abuts against the body or jacket 200 and exposed threads 218 are adapted to interconnect with the material outlet conduit from the agitation and/or rotor pump system. Although threads 218 are shown herein, it is understood that well-known types of conduit connection means are usable with this invention. A jet chamber 220 is adapted to threadably interconnect with threads 210 within the body 200 to such an extent that the fluid conduit 206 will be injected to that manifold space downstream of threads 222 on the jet chamber. The manifold portion being defined by the interior diameter of the body 200 and the outer face 224 of the jet chamber. The jet chamber further includes a plurality of circumferential openings 226 and a beveled face 228 which further includes a plurality of longitudinal slots 230, which provides communication past the mated beveled surfaces to the cylindrical opening 232 of the jet chamber. Although only one jet chamber is depicted in this view, it is understood that in the event additional conduits other than 204 and 206 are needed to supply other fluids, then additional jet chambers will be provided in tandem relationship to each other. At the end of the body 200 a front jet 236 is provided with threaded sleeve 238 for interconnection with threads 210. The front jet is threaded so as whereby the beveled surface 233 of the jet chamber engages with beveled surface 240 of the front jet. Spaced circumferentially around the front jet are a plurality of slots 242 which provide communication by passing the interengaged beveled surface into the cylindrical chamber 244. A lock nut 246 is provided to retain the system in its position. In some instances a nozzle barrel 248 is interconnected and retained by the lock nut 246.

Referring now to FIG. 8, an exploded partial sectional view, depicts the plural adjustment mechanism between the vat blades 84 and spiral rake blade 88 although it is applicable to the interconnection of all the spiral blades and rake blades. As shown, cross slots 250 and 252 are adapted to interconnect with similar cross slots 254 and 256 of the rake blade. By a bolted connection it can be thus seen that the blades can be shifted axially or radially as desired or needed from the various types of plastic materials which may be agitated and mixed within the compartments.

The invention has been described with reference to the specific and preferred embodiments. It will be apparent, however, that other modifications can be made without departing from the spirit and scope of the invention. For example, the nozzle embodiment shown in FIG. 7 is readily adaptable to use as inline boosters. That is the assembly of body 200 plus nozzle 212 and front jet 236 are interconnected with a single fluid entry 204 for air or other fluids and inserted in the conduit 103 every 100 ft. or less to move the plastic mix material through the hose. Accordingly, this invention should be construed not to be limited to the embodiment herein described but should be limited only by the scope of the appended claims.

I claim:

1. Apparatus for mixing and dispensing plastic materials of the type having at least one mixing chamber, means to receive a premeasured amount of ingredients for said material in said chamber, means to controllably agitate and mix said materials, and an outlet from said chamber, comprising:

a reversible rotor-stator type pump, the suction inlet of which is connected to said outlet from said chamber; and means to operate said pump such that in one direction to discharge mixed material to an outlet conduit or nozzle and in the reverse direction to withdraw material from said outlet conduit or nozzle.

2. Apparatus for mixing and dispensing plastic materials of the type having at least one mixing chamber, means to receive a premeasured amount of ingredients for said materials in said chamber, means to controllably agitate and mix said materials, and an outlet from said chamber, comprising:

a rotor-stator type pump, the suction inlet of which is controllably connected to said outlet from said chamber;

a conduit through said rotor having an outlet adjacent the discharge end of said rotor;

means to operate said pump to discharge mixed material to an outlet conduit or nozzle; and pressure fluid supply means connecting with the inlet of said conduit whereby materials being discharged are boosted by said fluid pressure to said outlet nozzle.

3. Apparatus according to claim 2 wherein there are two mixing chambers separated by a single wall and a rotor-stator type pump the suction inlet of which is controllably connected to the outlet from each of said chambers so as to receive materials from one or both of said chambers.

4. Apparatus for mixing and dispensing plastic materials of the type having two separated mixing chambers, means to receive premeasured amounts of ingredients for said materials in said chambers, means to controllably agitate and mix said materials and an outlet from each of said chambers:

a rotor-stator pump the inlet of which is controllably connected to the outlet from each of said chambers so as to receive materials from one or both of said chamber;

means to operate said pump to discharge mixed material to an outlet conduit or nozzle, said nozzle comprising:

a cylindrical body portion;

a material inlet nozzle connected at one end of said portion to discharge plastic materials thereto;

a first jet chamber seated against said nozzle and defining a central passageway and defining a first annular chamber between said nozzle and said jet chamber, a plurality of ports extending across the said seat to provide communications from said first annular space to said central passageway;

a plurality of circumferentially spaced openings providing communication from said first annular chamber to a second annular chamber;

a front jet seated against said first jet chamber to define and continue said central passageway and said second annular chamber, a plurality of ports extending across the said seat to provide communication from said second annular chamber to said central passageway; and and controllable first and second fluid supply means to said respective first and second annular chambers.

5. Apparatus according to claim 4 including additional jet chambers forming additional annular spaces and additional controllable fluid supply means to each of said annular spaces.

6. Apparatus according to claim 4 comprising in between the outlet from said rotor-stator type pump and said nozzle is at least one in-line booster comprising:

a cylindrical body portion;

a material inlet nozzle connected at one end of said portion to discharge plastic mixed materials thereinto a central passageway;

a front jet seated against said inlet nozzle and connected to the outlet from said body portion continuing said passageway and defining an annular chamber above said passageway, a plurality of ports extending across the said seat to provide communication from said annular chamber to said central passageway; and controllable fluid supply means to said annular chamber.

7. Apparatus according to claim 4 wherein said nozzle comprises:

a cylindrical body portion;

a material inlet nozzle connected at one end of said portion to discharge plastic mixed materials thereinto a central passageway;

a front jet seated against said inlet nozzle and connected to the outlet from said body portion continuing said passageway and defining an annular chamber above said passageway, a plurality of ports extending across the said seat to provide communication from said annular chamber to said central passageway; and controllable fluid supply means to said annular chamber.

8. A mixing and agitation blade comprising:

a central drive shaft;

at least one pair of spaced vat blades extending outwardly from attachment to said shaft and angularly oriented to move material in one direction;

at least one rake blade vertically extending from said vat blades and interconnected therewith, said interconnection comprising at least one cross-slot in said vat blade and at least one matching and parallel cross-slot in said rake blade; and means operable through said cross-slots to retain said rake blades and said vat blades rigidly together at a desired position.